United States Patent [19]

Chez

[11] Patent Number: 4,676,878
[45] Date of Patent: Jun. 30, 1987

[54] APPARATUS AND METHOD FOR ELECTRONIC DECOMPOSITION OF WATER INTO AQUEOUS FREE RADICALS AND FREE ELECTRONS

[76] Inventor: Ephriam Chez, 21 Braeside Terrace, Sherwood Park, Alberta, Canada, T8A 3V6

[21] Appl. No.: 816,313

[22] Filed: Jan. 6, 1986

[51] Int. Cl.$^4$ .............................................. C23P 1/30
[52] U.S. Cl. .................................... 204/101; 204/129; 204/130; 204/149; 204/275; 204/278; 204/240 R; 204/228; 204/291; 204/292; 204/294; 204/84
[58] Field of Search ................. 204/275, 84, 278, 129, 204/130, 149, 228, 257, 258, 101, 243 M, 263, 240 R, 266, 291, 294, 292

[56] References Cited

U.S. PATENT DOCUMENTS

| | | | |
|---|---|---|---|
| 3,616,355 | 10/1971 | Themy | 204/149 |
| 3,926,770 | 12/1975 | Hoekje | 204/256 |
| 4,036,727 | 7/1977 | Rahn | 204/268 |
| 4,094,751 | 6/1978 | Nozik | 204/80 |
| 4,219,392 | 8/1980 | Halmann | 204/72 |
| 4,329,219 | 5/1982 | Druzhinin et al. | 204/290 |
| 4,379,740 | 4/1983 | Nazzal | 204/129 |
| 4,461,691 | 7/1984 | Frank | 204/242 |
| 4,521,499 | 6/1985 | Switzer | 204/129 |
| 4,528,252 | 7/1985 | Yamazaki | 204/129 |

FOREIGN PATENT DOCUMENTS 1320617 6/1973 United Kingdom ................ 204/420

OTHER PUBLICATIONS

Louis Hemphill, Electrochemical Production of Free Radicals for Wastewater Treatment, May 20, 1976, pp. 1–8, 11, 27, 31.

Primary Examiner—R. L. Andrews
Attorney, Agent, or Firm—Shlesinger Arkwright Garvey & Fado

[57] ABSTRACT

An apparatus and method for the electronic decomposition of water into its component free radical parts and free electrons. In a cell containing an aqueous fluid, an electromotive force is applied to a positive charge storage core, insulated with semi-conductive material, and a conducting cathodic connector having a limited electrolysis bridge therebetween thereby inducing the formation of an aqueous condenser, the anodic section of which consists of the positive charge storage core insulated with the semi-conductive material. The formed aqueous condenser is subjected to overpotentials at which the dielectric breakdown of water occurs. The free radicals produced by such dielectric decomposition serve to treat most dissolved, suspended or precipitous substances in solution by oxidation/reduction reactions. The in-situ treatment process employs relatively low voltages and very low current intensities and is applicable in the treatment of various aqueous stock, such as raw sewage, without the use of chemical additives.

36 Claims, 6 Drawing Figures

APPARATUS AND METHOD FOR ELECTRONIC DECOMPOSITION OF WATER INTO AQUEOUS FREE RADICALS AND FREE ELECTRONS

BACKGROUND OF THE INVENTION

This apparatus and method involve the electronic generation of free radicals directly from water, or alternately from the waters of an aqueous fluid, the contents of which are required to be treated by oxidation/reduction reactions.

Aqueous free radicals are universally regarded as highly reactive reagents, useful in a wide variety of oxidation/reduction reactions. The most notable application of such free radical reactions to date is in wastewater treatment. These radicals have a potentially broader area of application for such purposes as desalination of water, the recovering of oxide ores from complex minerals in solution, water treatment in general and a host of other applications involving the chemical breakdown of suspended and/or dissolved mineral and organic compounds.

Aqueous free radicals are generally classified into two groups commonly referred to as primary free radicals and secondary free radicals. The primary free radicals include on the $OH^o$ and $H^o$ free radicals. The secondary free radicals include the $O^o$ radical and its variants. These variants comprise free radical complexes produced by the spontaneous combination of the free radicals with water or with each other. The basic family of aqueous free radicals includes $H^o$, $OH^o$, $H_2O_2^o$, $HO_2^o$, $H_3O^o$, and $O_3^o$ radicals. Other complex variants are known to exist. The $H^o$ and $H_3O^o$ radicals are regarded as weak reducing agents, while all other of the radicals are regarded as strong oxidizing agents.

These free radicals act to dismantle complex organic and mineral substances contained or dissolved in solution into constituents having insufficient chemical energy to react further with water. Such constituents are generally of the form of simple oxides, peroxides, hydroxides and the like, including also water and gases. With the exception of some of the gases formed, the constituents are passive, generally insoluble in water, and are therefore environmentally stable. Many of the reactants proceed by auto-oxidation through a free radical chain reaction mode resulting in an automatic recovery of the reagent radicals. Such recovered radicals continue to react with reactants in solution, freely complimenting the efficiency of the process. Free radicals usually react rapidly with the reactant materials and any excess radicals recombine to form water. Thus, free radicals provide a viable alternative to the use of chemical reagents in many treatment processes.

The difficulty posed until now for the generation of aqueous free radicals has been the requirement for high energy systems. Previously known methods for generating aqueous free radicals include the use of ultrasonic oscillation, gamma irradiation, high intensity ultraviolet light and high voltage electrical discharge. With the exception of the ultraviolet method which has already seen limited use in waste water treatment, such high energy methods have not had any practical applications.

THE INVENTION

According to the invention, an aqueous fluid containing dissolved and/or suspended reactants is subjected to oxidation/reduction treatment by aqueous free radicals in a suitable containment vessel or process cell. The vessel is equipped with a specialized anodic charge condenser assembly and a cathodic connector grid, the means through which the process cell is electrically energized. Direct current electrical energy is provided by a suitable power source.

A portion of the cell is devised to operate as a simple parallel-plate electrical charge condenser which serves to decompose water into aqueous free radicals and free electrons. The remaining portion of the process cell is devised to operate as an electrolysis bridge and serves as a mode for conducting electrical energy. The electrolysis bridge forms part of the circuit employed in energizing the process cell.

Free radicals are generated in the process cell by forming in the cell a condenser similar to an electrical charge condenser which is being subjected to an electrical overload. Such an electrical overload, referred to hereinafter as "overpotential", results in the molecular breakdown of the dielectric mass of a condenser, the nature of which is duplicated in the present process cell to generate free radicals.

The formed condenser consists of the specially devised anodic charge condenser assembly and an opposing electrically induced aqueous cathodic charge condenser plane. The electrically induced aqueous cathodic charge plane forms extremely close to the surface of the anodic charge condenser assembly creating a dielectric space of a size equivalent to that of only one or two molecules of water. Solution waters thereby act as the dielectric material and occupy the dielectric space of the condenser so formed. The extremely close spacing of the charged condenser surfaces allows for condenser overpotential to be achieved at low input voltages. When the potential applied to the process cell is such that overpotential for the formed condenser is achieved or exceeded, dielectric decomposition of the water in the dielectric space occurs, resulting in the formation of aqueous free radicals and the liberation of electrons. Primary free radicals are formed from individual molecules of water in accordance with the mass/energy balance $$H_2O + 12.6 \text{ eV/molecule} \rightarrow H^o + OH^o + 1e^- \qquad (1)$$

where the 12.6 ev represents the standard ionization potential of one molecule of water.

The primary $OH^o$ radical is also formed when any available $OH^-$ ion is electronically discharged in accordance with the mass/energy balance $$OH^- + 13.17 \text{ eV/molecule} \rightarrow OH^o + 1e^- \qquad (2)$$

where the 13.17 eV represents the standard ionization potential of one molecule of $OH^-$ ion.

Secondary $O^o$ radicals are predictably generated at slightly higher input voltages in accordance with the following mass/energy balance $$H_2O + 30.854 \text{ eV/molecule} \rightarrow O^o + H_2 \qquad (3)$$

where the 30.854 eV represents the total ionization energy required to separate the component hydrogen ($H_2$), or alternatively 15.437 eV per atom of hydrogen, which represents the standard ionization potential of molecular hydrogen.

The products of formula (1) above are detectable and are confirmed by a measurable pH rise in the solution being treated and by the measured effects of oxidation/reduction reactions on the solution, both of which are cited in Example 6. The products of (2) above are predicted in the basis of applicable physical laws, but are not differentiable from other $OH^o$ being formed in the process. The products of (3) above are also predicted and are detectable through the presence of ozone odour.

The formed condenser functions at low energy input through the use of a special anodic charge condenser assembly comprising either an insulated highly conductive core or an uninsulated high resistance core. The core of an anodic condenser assembly comprising a highly conductive material is both insulated from the aqueous fluid and electrically biased in a manner which greatly suppresses normal electrolytic exchanges and their associated energy losses related to the formation of $H_2$ and $O_2$ gases. Suppression of such energy loss is essential in conserving the energy required to build a useful overpotential charge on the formed condenser. A tolerable level of electrolysis is allowed to continue in the process to serve as a built-in electrical bridge convenient in energizing the process cell. This electrolytic bridge provides the means by which the aqueous cathodic charge plane is first induced to form. This bridge also serves as the resistance in the cell circuit by which excess electrical charges are diverted to that portion of the formed condenser which is devised to generate free radicals.

The conductive core of the anodic charge condenser assembly is insulated from the aqueous fluid by a p-type semi-conductive covering material having an energy gap greater than 1.23 eV. Such insulation effectively blocks out normal electrolytic exchanges by acting as a barrier against the transfer of the low energy electrons (1.23 eV) essential for the electrolysis of water. More concisely, the insulative quality of the semiconductive material prevents the type of anodic contact conductivity that is essential to the electrolysis of water. Instead the p-function of the semi-conductive material provides an electronic, or arc-discharge type of conductivity which permits only the transfer of higher energy electrons liberated during the generation of the free radicals (minimum 12.6 eV). Such prevention of contact conductivity and the associated rapid energy losses to electrolysis results in the economical build-up of overpotential charges on the formed condenser. As the radicals are formed (at the identified ionization potentials), the liberated electrons are accelerated through intermolecular space, in the form of a molecular-sized arc, into the positively charged holes of the semi-conductive material. Such free electrons are then transmitted to the conductive core of the anodic condenser assembly and ultimately dissipated to ground either by a direct grounding circuit or through the internal shunt of the power supply employed in energizing the cell.

The minimum input voltages required to energize the cell and to charge the aqueous condenser to the overpotentials at which free radicals are formed are determined by the application of Kirchhoff's Second Law, which justifies that the input voltage must be equal to the sum of all back EMF's (or voltage losses) encountered in the internal circuit of the cell. Given then that the minimum insulative energy gap of the semi-conductive insulation is greater than 1.23 eV, and that the natural back EMF of water is 0.4 V (constant), the minimum input voltage of the generation of primary free radicals $OH^o$ and $H^o$ from water is $$0.4\ V + >1.23\ eV/e + 12.6\ eV/e = >14.23\ V,$$

and for the generation of primary radical $OH^o$ from $OH^-$ ion is $$0.4\ V + >1.23\ eV/e + 13.17\ eV/e = >14.80\ V,$$

and for the generation of secondary radical $O^o$ from water through separation of the hydrogen component is $$0.4\ V + >1.23\ eV/e + 15.427\ eV/e = >17.057\ V$$

As discussed, electrolytic activity of tolerable and useful levels is essential to the process. Such electrolysis serves as a conductive bridge and is introduced into and maintained in the circuit by means of a suitable contact conductive bias built into the otherwise insulative p-type covering on the anodic charge condenser plate. Functional built-in bias is afforded by any material which offers the type of contact conductivity essential to the electrolysis of water. The built-in bias may be achieved by: mixing in or doping the coating material with an n-type semi-conductive material of any energy gap; mixing in or doping with other p-type semi-conductive material having an energy gap less than 1.23 eV; the inclusion of high resistance contact conductivity points suitably distributed over the area of the anodic condenser assembly; or, by the inclusion of pores in the coating material permitting contact conductivity but restrictive as to the amount of electrolytic activity they will permit. The employment of a semi-conductive material offering both p and n functions serves as a convenient insulator by providing its own natural contact conductivity bias. Silicon dioxide ($SiO_2$) is one of such materials which offers both functions at an energy gap greater than 1.23 eV and also a favorable proportion of p-function (approximately 20% p and 80% n by nature). Silicon dioxide ($SiO_2$) is used in the examples of this invention, but other natural or synthetic materials having the appropriate electronic and electrochemical properties may be used.

Figure 3:
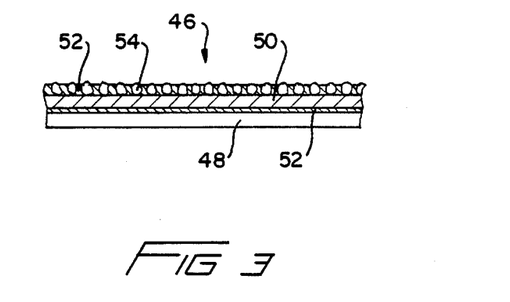

The tolerable level of the essential electrolysis and therefore its total supportive electrical contact conductivity bias area is governed by the amount of dissolved salts (and/or acids) in the cell fluid. Dissolved salts and acids tend to make the fluid more conductive through the development of independent ionic bridges resulting in accellerated electrolytic activity. Such highly conductive bridging results in undesirable energy losses to electrolysis and tends to discharge or otherwise prevent the adequate electrical charging of the all important aqueous condenser. The inclusion of such ionic bridging, as encountered in the process of desalination, must be compensated for by a suitably proportional reduction of contact conductivity bias area relative to the concentration of ionic substances in the cell fluid. The anodic condenser assembly shown in FIG. 3 is extremely effective for the removal of salt (NaCl) from salt solution because it presents only the contact conductivity available from the n-function of the $SiO_2$ bed. The total electrolysis is therefore limited to the electrical capacity of the semi-conductive material irrespective of the overall conductivity of the electrolysis bridge.

Anodic charge condenser assemblies can be made with cores of suitable conductive material. Where the cores comprise purely conductive or electrochemically soluble metals, total isolation of the cores from contact with cell fluids is very essential. Imperfect isolation of such metallic cores results in rapid electrolysis which short-circuits the electrical power required to drive the aqueous condenser to overpotential, thereby also preventing the generation of free radicals. Paraffin wax is one example of a material suitable for isolating a conductive core and is shown in FIG. 3 of this invention. The use of electro-chemically oxidizable metals, such as lead, which can form an impervious and insoluble oxide coating which is also semi-conductive, and with the appropriate electrical properties, requires less attention to isolation. Anodic condenser assemblies may also comprise uninsulated cores of electrochemically stable materials having high electrical resistance.

When the core of the anodic condenser assembly consists of carbon or graphite, total isolation from contact with cell fluids is not essential for low-salt solutions. Graphite naturally develops an extremely high surface resistance to electrical conductivity when employed in the anodic capacity during aqueous submersion. The amount of contact conductivity and electrolysis offered by graphite (carbon) is sufficiently low and therefore tolerable in the make-up of an anodic condenser assembly for applications other than desalination. A covering bed of loose granular semi-conductive material placed over a graphite core results in a very functional condenser assembly and is discussed in Example 3 and shown in FIGS. 2 and 4.

In the make-up of any anodic charge condenser assembly, each granule of the semi-conductive material acts independently to form a miniature aqueous condenser capable of generating free radicals while submerged and in the presence of an electrical field having the required overpotential qualities. The overall productivity of free radicals according to this invention is therefore determined by the particle or granule size of the semi-conductive material employed and also the depth to which it is applied. Productivity is also governed by the electron/hole mobility of the semi-conductive materials employed.

Input current and wattage are therefore also governed by the electron/hole mobility, the energy gap, and the particle or granule size of the semi-conductive material employed, and the depth to which it is applied. Each anodic condenser assembly therefore has its own characteristic electrical properties. The anodic condenser assembly used in Examples 6 and 7 of this invention exhibited an average current capacity of 0.0025 amperes per square inch of active surface. At 14.5 V applied potential the energy demand for the cell discussed in Examples 6 and 7 averaged 0.03625 watts per square inch. This input is considerably less than the minimum 10.5 watts per square inch required to generate free radicals from pure water by overpotentials applied to a normal electrolytic cell containing platinum electrodes.

A functional semi-conductive bed can therefore be of any depth, placed loosely, or bound into a porous matrix with suitable cementitious materials. Silica flour and colloidal silica (being compatible with $SiO_2$), are examples of such cementitious materials, and are discussed with respect to FIG. 5. The energized porous bed can be extended dimensionally to act as a treatment filter, projected as one method of treating solutions in a flow-through condition.

The useful radicals generated in this invention carry zero charge. They are therefore not affected by the presence of electrical fields and disperse freely into the cell fluid. The free dispersion of the radicals permits an unlimited flexibility in the size, configuration, and orientation of both the cathodic connector and the anodic condenser assembly and the multiplicity of each and the spacing thereof. The containment vessel can therefore also have any size and configuration suitable for a holding tank (for static treatment requirements) or any size or configuration appropriate to an open or enclosed conduit for the treatment of a flowing stream. The process is therefore relatively independent of sizes, configurations, and orientations.

Because of the corrosive nature of the process, all components of the apparatus that are in contact with the cell fluid must be selected carefully. All materials employed must be insoluble, electrochemically stable and as non-reactive as possible with the free radicals or the contents of the fluid. Corrosion of the cathodic connector grid (not encountered in normal electrolysis) is very extensive under the attack of the $OH^o$ radical especially if the connector is made of metal rated high in the electromotive series, such as the aluminum cited in Example 1. Metallic cathodic connectors employed should therefore be selected from, or at least protected by, metals rated at the lowest order of the electromotive series. Alternatively, protection can also be provided by semi-conductive coatings adapted to provide a total electrical conductivity greater than that which is required by the contact conductivity bias in the anodic condenser assembly. Conductive non-metals such as carbon may also be employed as cathodic connectors.

It is predicted that the process and apparatus will operate most efficiently within the voltage range in which the primary free radicals $H^o$ and $OH^o$ are generated. Higher voltage ranges simply result in the formation of the $O^o$ free radical together with $H_2$ gas. The $H_2$ gas has no practical value in the process and the associated higher voltage levels result in a less efficient use of the available energy. However, there is no theoretical upper limit to the applied voltage. A wide variety of materials, configurations and sizes are possible in the construction of the anodic condenser assembly and also for the cathodic connector and the process vessel.

The apparatus and process of the invention can be employed in, but are not necessarily limited to: raw water and wastewater treatment; the removal of toxic metals and reagents from water; the recovery of valuable metal oxides from natural minerals placed in aqueous solution or suspension; the desalination of brackish and salt waters; and the general demineralization and decontamination of water to provide potable and environmentally clean water while harvesting the valuable by-product gases, metal oxides, peroxides, hydroxides, etc. The removal of the by-products of the process can be done by conventional means and, as such, does not form part of the instant process and apparatus.

DESCRIPTION OF SPECIFIC EMBODIMENTS

Figure 1:
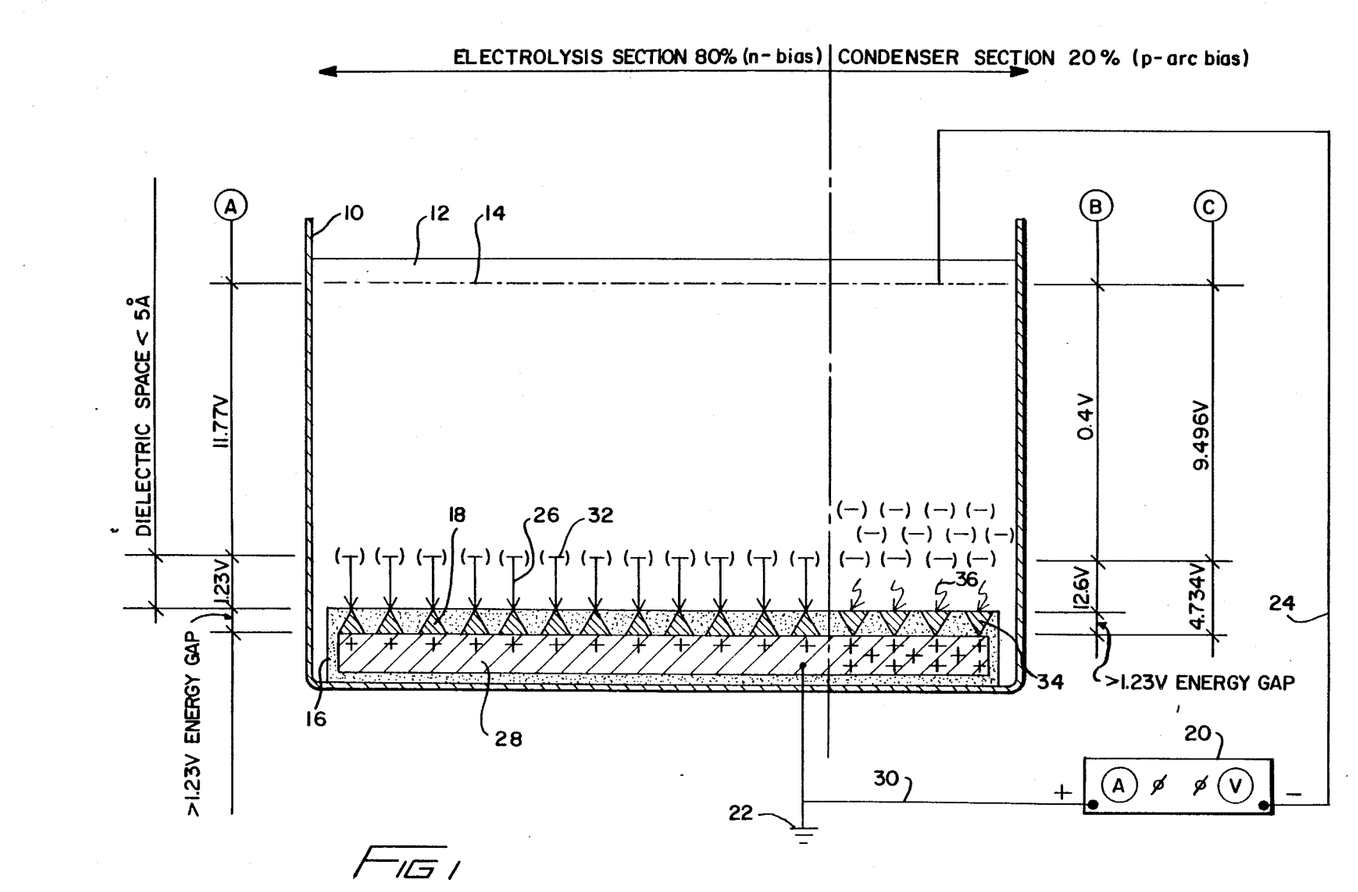
FIG. 1 is a schematic representation of a cell according to the invention.

FIG. 1 is a schematic representation of a specific process cell according to the invention. The two electrically motivated cooperating processes occurring simultaneously in the cell are, for the sake of clarity, shown as being separated within the cell. The electrolytic process, which serves as a conductive bridge in the energizing circuit, is presented in the schematic as the ELECTROLYSIS SECTION. The process of electronic decomposition of water into free radicals and free electrons is presented as the CONDENSER SECTION.

For the purpose of direct comparison to the cell employed in the controlled tests of Examples 6 and 7 and for the purpose of examining the relative electrical efficiency of a particular cell, the schematic representation is shown to contain an anodic condenser assembly having 80% of its active surface in the form of n-type contact conductivity biases which supports electrolysis, and 20% as p-type arc bias which supports the generation of free radicals. The minimum energy gap of greater than 1.23 eV is assigned to the p-type arc bias. Although not absolutely necessary, except for the sake of comparison, the schematic also assumes an identical energy gap for the n-type contact bias.

A vessel 10 is provided containing an aqueous fluid stock 12 which flows through the vessel or remains static and which further contains undefined suspended and/or dissolved substances. The vessel 10 itself is provided with a bare metal wire-mesh cathodic connector grid 14 immersed in the cell fluid 12, forming thereby a wet connection with the fluid 12. The fluid 12 being electrochemically conductive, is further connected to the anodic condenser assembly 16 through the n-type contact conductivity biases symbolized by the upright pyramids 18. The fluid which occupies the space between the cathodic connector grid 14 and the anodic condenser assembly 16, being electrochemically conductive, is hereinafter referred to as the electrolysis bridge.

The cathodic connector grid 14 and the anodic condenser assembly 16 are connected by suitable electrical wiring to a direct current power supply 20. The cathodic connector grid 14 is connected to the negative terminal of the power supply 20 while the anodic condenser assembly 16 is connected to the positive terminal. The anodic condenser assembly 16 is also connected to ground 22, or is otherwise grounded through the internal shunt of the power supply 20 if it is so equipped.

Allowing that the power supply 20 employed is internally shunted, and is pre-set at slightly higher input levels of current and voltage than is characteristic of the particular anodic condenser assembly 16, an electromotive force is applied to the cell and an electrical current is permitted to flow through the whole of the circuit which includes the cell. The pre-set input voltage automatically adjusts downward to the level of the total back EMF offered by the cell when dielectric decomposition of water commences. The excess of the pre-set voltage and current are dissipated through the internal shunt of the power supply 20. The input potential thus establishes itself as equivalent to the total of back EMFS in the ELECTROLYSIS SECTION as tabulated along line A. The input potential thus also established itself as equivalent to the total of back EMFs in the CONDENSER SECTION as tabulated along line B. The input voltage on the ELECTROLYSIS SECTION is also equal to the input on the CONDENSER SECTION. The input current adjusts automatically to the full current carrying capacity of the anodic condenser assembly 16 relative to the applied voltage.

The ELECTROLYSIS SECTION of the cell provides a complete loop circuit through which driven electrons can flow from the power supply 20 by wire conductor 24 to the cathodic grid 14, from grid 14 to the fluid 12 (electrolysis bridge) by electron-to-cation transfer, from the electrolysis bridge to the n-biases 18 by contact conductive electrochemical exchange as symbolized by the arrows 26, from the n-biases 18 to the core 28 of the anodic condenser assembly 16 by semi-conduction, and from the core 28 back to the power supply 20 via the wire conductor 30. As the electromotive force is applied, a weak, negatively charged aqueous plane 32 is formed within molecular proximity of the face of the anodic condenser assembly 16. The formation of the negatively charged plane 32 is accompanied by an equal and opposing positive charge build-up in the anodic condenser assembly 16. The opposingly charged aqueous plane 32 and condenser assembly 16 together form an electrically induced aqueous condenser. When the condenser thus formed acquires a charge such that the potential between its two surfaces achieves 1.23 V (as tabulated along line A) the waters of the aqueous fluid 12 in the dielectric space of the condenser commence to electrolyze, completing an electrochemically conductive bridge between the cathodic connector grid 14 and the anodic condenser assembly 16. This bridge thus provides an unique conductive mode whereby the weakly charged form aqueous condenser can be charged to higher potentials. Electrolysis cannot occur in the CONDENSER SECTION because the insulative energy gap of the p-biases symbolized by the inverted pyramids 34, is greater than the energy level (1.23 eV) of the electrons associated with electrolysis of water.

The applied voltage, being greater than is necessary for the electrolysis bridge to function, provides also the electromotive force whereby the aqueous condenser is charged to higher potentials. As the charge on the aqueous condenser increases to 12.6 V (tabulated along line B) dielectric breakdown of water commences, resulting in the generation of free radicals and the liberation of electrons. When the mentioned dielectric breakdown commences, the voltage drop across the aqueous condenser stabilizes at 12.6 V and the applied cell voltage stabilizes at greater than 14.23 V. The remaining 0.4 V drop in the CONDENSER SECTION (tabulated along line B) represents the natural back EMF of water. The remaining 11.77 V drop in ELECTROLYSIS SECTION (tabulated along line A) represents the sum of the natural back EMF of water plus the cation transport losses in the electrolysis bridge.

Primary free radicals are formed from individual molecules of water in accordance with the mass/energy balance $$H_2O + 12.6 \text{ eV/molecule} \rightarrow H^o + OH^o + 1e^-$$

conforming to the standard ionization potential of 12.6 eV/molecule of water. The liberated electrons, being high energy electrons (12.6 eV), are discharged by arc conductivity as symbolized by the arrows 36 in the semi-conductor holes symbolized by the inverted pyramids 34, and thereby transmitted to the core 28 of the anodic condenser assembly 16, and ultimately to ground 22. The cell of FIG. 1 must be grounded to prevent accumulation of the liberated electrons in the circuit. Such excess charges in the circuit upset the input voltage and the metering thereof.

Free OH° radicals are predicted to be generated from OH⁻ ion at a minimum applied cell potential of greater than 14.80 V with a 13.17 V potential drop across the aqueous condenser, conforming to the standard ionization potential of 13.17 eV per molecule of OH⁻. Secondary free radical O° is generated from individual molecules of water at the higher minimum applied cell potential of greater than 17.057 V with a 15.427 V potential drop across the aqueous condenser, conforming to the standard ionization potential of 15.427 eV for molecular hydrogen.

The free radicals thus formed have no electrical charge and disperse freely into the cell fluid to react with the substances therein.

The average voltage drops within the cell are tabulated along line C of the schematic. These tabulated averages agree closely with the measured cell voltage losses associated with the $SiO_2$ insulated anodic condenser assembly of FIG. 3. A cell with this anodic condenser assembly had a semi-conductor energy gap of 1.5 V and yielded a measured 5.0 V drop across the condenser assembly with 9.5 V loss in the fluid column.

The electrical efficiency of the cell of FIG. 1 is determined from the ratio of useful energy expanded per unit of time to the total energy expended for the same unit of time. Each electron moved out of the CONDENSER SECTION requires 12.6 V of potential, or a total of 12.6 eV of electrical energy, which is deemed useful to the process. Each electron moves through the ELECTROLYSIS SECTION requires 1.23 V of potential, or a total of 1.23 eV of electrical energy, which does not contribute to the generation of free radicals.

The number of electrons moved out of the CONDENSER SECTION is a function of the relative electron/hole mobilities of the semi-conductor supporting the two processes and is therefore equivalent to the ratio of the strength of their respective electrical fields. The number of electrons moved out of the CONDENSER SECTION is 12.6 eV/1.23 eV = 10.244 times greater per unit of area than through the ELECTROLYSIS SECTION.

But, for each set of electrons moved out of the CONDENSER SECTION, there are four electrons moved through the ELECTROLYSIS SECTION, being in the same proportion as n-type contact bias to p-type arc bias. Also, for each set of electrons moved out of the CONDENSER SECTION, there are four cations (H⁺) transported through the electrolysis bridge serving the ELECTROLYSIS SECTION or alternately through a field of 11.77 V potential. The electrical efficiency of the cell of FIG. 1 is therefore determined to be:

$$E_e = \frac{\text{Useful Energy}/t}{\text{Total Energy}/t} \times 100 =$$

$$\frac{10.244\ (12.6\ eV)}{10.244\ (12.6\ eV) + 4(1.23\ eV) + 4(11.77\ eV)} \times 100 = 71.3\%$$

Although the p to n ratio of the hypothetical cell of FIG. 1 (which closely approximates the tested cell) is relatively low, it is a relatively efficient and functional cell as is demonstrated in Examples 4, 5, 6 and 7.

Electrical efficiency can be made to approach 100% by reducing the energy losses in electrolysis to near 0%. Such efficiency is achievable for increasing the proportion of p-type arc bias in relation to n-type contact conductivity bias. Insulation of the anodic condenser core 28 with 100% p-type material is of no value since it would totally prevent electrolysis and the formation of the associated very finely spaced aqueous condenser so valuable to the invention.

The overall productivity of any anodic condenser assembly, regardless of its efficiency, is directly related to the total area of semi-conductive p-type surface exposed to the cell fluid. The total exposed area is further determined by the particle or granule size of the semi-conductive material employed and also the depth to which it is applied. Such variability is an indication that some difficulty would be encountered in the construction of anodic condenser assemblies having identical electrical characteristics and productivity rates.

Figure 2:
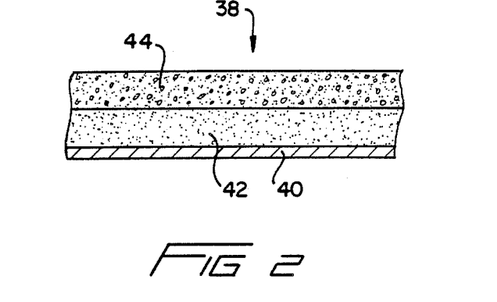
FIGS. 2 through 5 are fragmentary cross-sectional schematic views of anodic condenser assemblies usable in the invention.

FIG. 2 illustrates an anodic condenser assembly 38 according to the invention having a ¼" thick untreated carbon contact conductivity plate 40 with successive layers of a 1" thick layer of loose beach sand ($SiO_2$) 42 and 1" thick layer of loose quartz sand ($SiO_2$) 44. Carbon was selected for use in an anodic condenser assembly because it is very resistant to anodic breakdown and also because it develops an extremely high surface resistance when used in an anodic function while submerged in aqueous solution. Such high surface resistance highly suppresses contact conductivity and therefore offers only limited support for electrolysis and does so with little regard for perfection in insulation requirements. The performance of a cell having the anodic condenser assembly 38 is discussed in Example 3.

FIG. 3 illustrates another anodic condenser assembly 46, usable in any position and portable, comprising a stiff (lucite) foundation plate 48 supporting a ⅛" thick lead sheet 50 isolated from contact with cell fluid on all sides by a coating of paraffin wax 52. The lead sheet 50 is coated on one side with silica gel ($SiO_2.xH_2O$) crystal 54 of #10 seive size, imbedded in the paraffin wax 52 in a manner which exposes the crystal 54 to contact with cell fluid while also maintaining physical contact with the lead core 50. Such physical contact was made conductively sound through the removal of the surface oxides from the lead sheet 50 by abrasion. Paraffin wax 52 was selected as the isolating material on the basis of its high chemical stability and its workability for the construction of the very simple anodic condenser assembly 46. Lead was selected as the conductive core 50 because of its natural ability to form quickly a semi-conductive oxide useful in self-insulation where minor faults exist or otherwise develop in the protective paraffin isolating coat 52. The performance of a cell having the anodic condenser assembly 46 is discussed in Examples 4, 5, 6 and 7.

Figure 4:
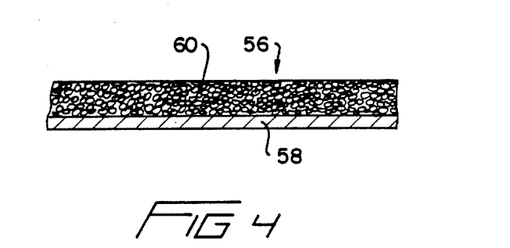

FIG. 4 shows another anodic condenser assembly 56 which comprises a ¼" thick carbon plate 58 the pores of which are impregnated with paraffin wax by hot soaking in melted paraffin. Excess wax was removed to expose suitable contact surface. Plate 58 is overlaid with a ½" thick bed of loose ungraded commercial silica gel ($SiO_2.xH_2O$) crystal 60. The impregnation of pores in the carbon plate 58 effectively reduced electrolytic activity by reducing the otherwise available contact conductivity area offered by the pores. In reducing such contact conductivity, the assembly 56 is also successful in suppressing salt bridge losses and is very effective in the conversion of sodium chloride salt into free chlorine gas ($Cl_2$) and its insoluble peroxide ($Na_2O_2$).

Figure 5:
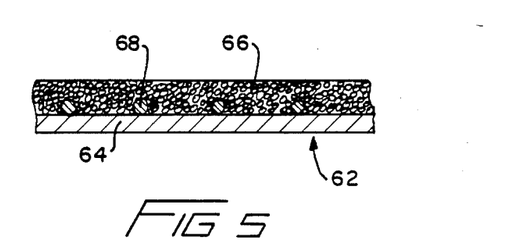

FIG. 5 illustrates an anodic condenser assembly 62 in which semi-conductive granules are electrochemically fused into a solid porous matrix suitable for the purpose of portability and orientations other than horizontal.

The anodic condenser assembly 62 comprises a ¼" thick carbon plate 64 impregnated with wax to suppress both electrolysis and salt bridge bias area. The plate 64 is overlaid with a ½" thick loose bed of #20 sieve silica sand ($SiO_2$) 66 mixed with #600 sieve-size silica flour ($SiO_2$) as filler material. The loose semi-conductive bed 66 is fused into a solid porous matrix around carbon anchors 68 which are fixed to the carbon plate 64. Fusion of the granular bed 66 is induced by adding colloidal silica to the cell solution (tap water) while applying the required electromotive force of 14.5 V. The assembly 62 performs well in the conversion of sodium chloride salt to form chlorine gas ($Cl_2$) and its insoluble peroxide ($Na_2O_2$). Such abilityy to convert salt serves as a good test in proving the functionality of a given anodic condenser assembly.

Silica ($SiO_2$) is only one of a number of natural or synthetic semi-conductive materials usable in the apparatus and process as determined by energy gap requirements, favorability of p to n proportion, and electrochemical stability.

High resistance, non-oxidizing, direct contact cores such as carbon may be used requiring little attention in regard to insulation and isolation. Such materials are useful in large volume open treatment cells employing deep horizontal beds of silica sand, or other suitable semi-conductive granular material having the appropriate properties. Such beds of semi-conductive material may be loose or cementitiously bonded.

Conductive metallic cores may also be used. These must be insulated in a manner which provides a proportion of p-type arc conductivity favorable to their intended applications. The insulation must contain suitable contact conductivity bias adequate for maintaining the levels of electrolytic activity beneficial to the intended applications. Such bias must also be adequate in suppressing ionic bridge conductivity losses as will be encountered in solutions containing dissolved salts, acids etc. The mentioned insulation, which includes the p-type arc conductivity bias and the direct contact conductivity bias, must also act to isolate totally the metallic core from contact with the cell fluid to avoid electrolytic short circuits. This can be achieved with a primary coating of a suitably semi-conductive nature bonded to the core with cementitious materials to form an integral sealed jacket. The depth of the active granular bed can thereafter be increased to suit the free radical productivity requirements for the intended application. Such increase in active bed depth can be achieved by successive applications of semi-conductive granules either applied loosely or using suitable cementitious materials and methods to form an integrally attached porous matrix. The anodic condenser assemblies containing metallic cores have practical applications in smaller, open or closed, treatment systems employing multiple anodic condenser plates for high volume treatment such as the polishing of raw water for potable use.

EXAMPLE I

As an initial test, a cell similar to that described in FIG. 1 is utilized with clean tap water. The test cell is equipped with a silica ($SiO_2$) anodic condenser assembly having an energy gap of 1.5 eV conforming to any of the structures presented in FIGS. 2, 3, 4 and 5. The clean water provides the operator with a clearer view of the activity occurring in the cell. When the cell is placed into operation at 14.5 V cell input and according to the parameters of the invention, there is no visually apparent activity in the cell for approximately the first half hour of operation. After the elapse of such time gassing becomes extensive at the cathodic grid while only barely detectable at the anodic condenser assembly. In the normal electrolysis of water there is no electrochemical deterioration of the cathode regardless of the metal used. Such is not the case with the present method and apparatus. Metallic cathodic connectors (especially those in the upper ranges of the electromotive series) are subjected to severe oxidation attack from the free radicals being generated. This oxidation attack results in an incrustation on the surface of the cathodic connector grid accompanied by relatively large amounts of hydrogen gassing.

In the case of an aluminum cathodic connector the reaction appears to conform to the following electrochemical reaction equation:

$$2Al + 4OH^o + 2H_2O + 4e^- \rightarrow Al_2O_3 \cdot 3H_2O + H_2$$

This has not been verified by qualitative analysis, but the incrustation is a pinkish-brown powdery residue, the colour and texture of which conforms to that of hydrated alumina. There was no visually apparent discoloration of the water in the cell.

Oxidation attack on the cathodic grid is detrimental to the overall efficiency of the cell when the intended function for the free radicals is to react with substances in the cell fluid. The reaction at the cathodic grid and its related chemical energy losses can be avoided or reduced through the application of protective coatings using metals which are in the lower ranges of the electromotive series, such as gold, platinum etc., or coating with electrochemically stable semi-conductive materials of suitable electrical properties.

EXAMPLE II

Evidence of corrosion of the cathodic connector grid is indicative of a cell producing free radicals. However, more practical results can be obtained by the introduction of a soluble salt such as sodium chloride into the cell fluid.

Free radicals react with the dissolved salt to liberate chlorine gas and to bind the remaining sodium into an insoluble peroxide floc. The chlorine gas odour is noticeably detectable within about 15 minutes after the addition of the salt to the cell water. The formation of sodium peroxide floc on the surface of the fluid commences within just several minutes.

In all probability, the reaction with salt occurs in several steps. However, the overall reaction appears to conform to the reaction equation:

$$2Na^+ + 2Cl^- + 2OH^o \rightarrow Na_2O_2 + H_2 + Cl_2$$

The liberation of chlorine gas is expected because the $OH^o$ radical has a greater standard electrode potential (being therefore higher in the electromotive series) than the chlorine ion and will therefore displace the chlorine out of solution resulting in sodium to oxygen bonding.

The accumulation of chlorine is visible above the surface of the anodic condenser assembly as a laminar greenish-gray discoloration. Disturbing the discolored layer, brings up the chlorine odour to the surface immediately. It is anticipated that the chlorine is liberated in mid-stream, near the anodic condenser assembly where the concentration of free radicals would be the greatest in a static fluid cell.

No attempt has been made to substantiate the existence of hydrogen formation in this salt reaction because it is altogether too difficult to differentiate such hydrogen formation from other hydrogen gassing occurring at the cathodic connector grid as described in Example I.

EXAMPLE III

A cell fluid was prepared from organic-free clay mineral ground to pass through a #200 sieve and mixed with potable tap water. As much of the mineral clay powder was mixed into the water as it would accept. The mixture was then allowed to stand for about 10 minutes to allow the larger particles to settle out.

This test was conducted with the anodic condenser assembly described in FIG. 2 in a vessel which was 5" wide 8" long and 5" deep. The clay suspension was decanted carefully into the cell container so as not to disturb the sand bed overlying the carbon contact plate. The vessel was filled until the cathodic connector grid was submerged. A direct current was then permitted to flow through the cell. After a few minutes to operation, a medium boron coloured froth commenced to collect on the surface of the solution. This froth was collected and dried yielding a slightly pinkish-white powder having the consistency and texture of talcum powder. Approximately 4 hours of operation of the process yielded approximately 15 cubic centimeters of the final dry product. The 4 hour period of operation also produced a noticeable fusion of the surface grains of the sand bed which formed a thin brittle crust.

An analysis of the powder produced suggests that the clay mineral underwent extensive oxidation. The sample, dried at 500° C., contained a disproportionately high content of oxides which were free of silicates, and a disproportionately low content of silicon dioxide. Calcium oxide, magnesium oxide, and aluminum oxide were each present at 20%, 22% and 19% by weight respectively, while the silicon dioxide content was less than 5% by weight. The remaining portion of the sample was made up of approximately 32% water (removed in drying) and less than 3% other trace oxides.

The oxidation of the aluminum felspar component in the clay sample appears to have proceeded in accordance with the following reaction equation:

The reaction equation suggests that the free radical OH° was reconstituted upon completion of the reaction. Such automatic reconstitution of the reagent radical is similar to the known process of auto-oxidation by free radical chain reaction wherein the free radical remains available to perform further reactions. The $2SiO_2.xH_2O$ was deposited onto the loose sand anodic condenser bed binding the surface granules into the thin and brittle glassy crust. The hydrated alumina, which forms as a minute floc in mid-stream of the cell, was transported to the surface of the cell fluid apparently by the minute oxygen bubbles created at the anodic condenser assembly by the suppressed electrolysis.

The above equation represents only one of the clay minerals in suspension (i.e. the alumino-silicate). Similar equations apply to the calcium and magnesium silicates that were also present in the clay sample. The resultant by-products of the reaction (e.g. alumina and silica gel) are environmentally stable and recoverable oxides in their hydrated forms.

It should be noted that the cell had no oxidation effect on clay when the anodic section consisted solely of the carbon plate.

EXAMPLE IV

A cell similar to that shown in FIG. 1 was utilized in the treatment of water denatured with ammonia. The test cell was equipped with a silica gel ($SiO_2.xH_2O$) anodic condenser assembly having an energy gap of 1.5 eV conforming to the anodic assembly described in FIG. 3. The anodic condenser assembly was of 7"×15" dimension, and the cathodic connector grid of steel wire mesh was of similar dimensions.

Approximately half a cupful of ammonia solution was added to the cell filled with tap water and a potential of 14.5 V was applied to the cell. The strong odour disappeared completely in less than one hour of treatment. It is anticipated that the resultant odourless condition was brought about by oxidation of the ammonia forming water and hydrogen and nitrogen gases (all of which are odourless) apparently conforming to the reaction equation:

$$2NH_3 + 2OH° \rightarrow 2H_2O + 2H_2 + N_2$$

EXAMPLE V

Employing the same test apparatus and method cited in Example IV, the treatment of insoluble calamine powder resulted in the formation of large quantities of pure white floc on the surface of the cell fluid and the total disappearance of the insoluble pink calamine powder which had precipitated onto the surface of the anodic condenser assembly. The reaction appears to conform to the following representation where the free radical is again reconstituted:

EXAMPLE VI

Employing the same test apparatus and method cited in Examples IV and V a quantity of raw sewage was treated to determine quantitative oxidation effects on the specific biochemical and chemical oxygen demands (BOD and COD) of the sewage. The vessel employed had a width of 7¾", a length of 15¾", and a height of 9". The anodic condenser assembly was placed at the bottom of the vessel, and the cathodic connector grid as near the top of the vessel as possible, in a manner similar to the cell of FIG. 1.

Figure 6:
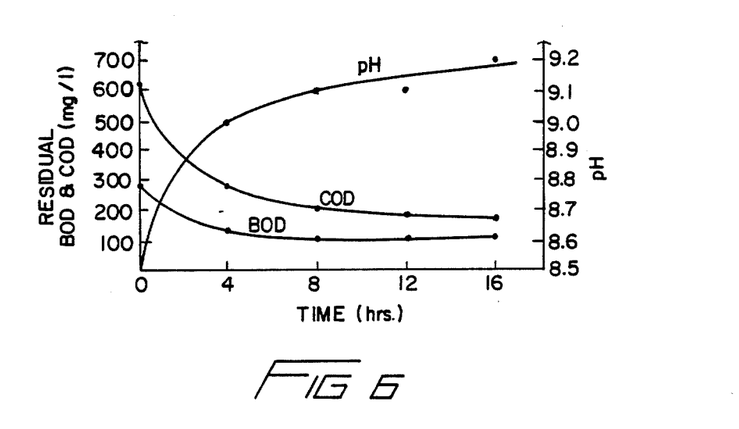
FIG. 6 is a graph of the results obtained in Example 6.

A sample of raw sewage was obtained and tested initially for BOD and COD values. The sample was then introduced into the cell and treated with conditions being monitored on an hourly basis and samples being taken every 4 hours. The cell solution was stirred lightly after all observations were made after sampling for BOD and COD. Table 1 contains the data obtained. The data is plotted in graph form in FIG. 6.

TABLE 1

| HOURS | TEMP °C. | pH | VOLTS | AMPS | RESIDUAL BOD MG/L | RESIDUAL COD MG/L |
|---|---|---|---|---|---|---|
| 0 | 15° C. | 8.5 | 14.5 | 0.1 | 276 | 620 |
| 1 | 16° C. | 8.5 | 14.5 | 0.2 | | |
| 2 | 16° C. | 8.7 | 14.5 | 0.3 | | |
| 3 | 17° C. | 8.9 | 14.4 | 0.4 | | |
| 4 | 17° C. | 9.0 | 14.3 | 0.3 | 108 | 260 |
| 5 | 18° C. | 9.2 | 14.4 | 0.1 | | |
| 6 | 19° C. | 9.1 | 14.4 | 0.2 | | |
| 7 | 19° C. | 9.1 | 14.4 | 0.1 | | |
| 8 | 19° C. | 9.1 | 14.4 | 0.2 | 95 | 185 |
| 9 | 19° C. | 9.1 | 14.4 | 0.1 | | |
| 10 | 19° C. | 9.1 | 14.4 | 0.1 | | |
| 11 | 19° C. | 9.1 | 14.4 | 0.1 | | |
| 12 | 19° C. | 9.1 | 14.3 | 0.1 | 89 | 155 |
| 13 | 20° C. | 9.0 | 14.3 | 0.3 | | |
| 14 | 20° C. | 9.1 | 14.3 | 0.2 | | |
| 15 | 20° C. | 9.2 | 14.3 | 0.2 | | |
| 16 | 20° C. | 9.2 | 14.3 | 0.1 | 93 | 145 |

Visual observations of the contents of the cell during the 16 hours in which treatment was applied revealed that there was initially no visual reaction followed first by gassing at the cathodic connector grid and an increase in cell cloudiness. Subsequently, a scum buildup began on the surface of the fluid which eventually increased to cover the entire surface of the fluid, followed by a gradual lightening in the colour of the solution and a noticeable decrease in odour. The observed changes in the sewage sample were accompanied by measured increases in the pH level of the fluid from an initial pH of 8.5 to a pH of 9.2 at the conclusion of the test. Such rise in the pH level substantiates that the (OH) form is present. The reduction of BOD and COD by 66.3% and 76.6% respectively indicates that the sewage sample underwent extensive oxidation and the rise in pH indicates that the operating oxidizing agent is the $OH^o$ radical.

The agent could not have been the $OH^-$ ion which is formed at and reduced to oxygen and water directly at the anodic condenser assembly (as part of the suppressed electrolysis) being prevented thereby from reacting with the solution.

The pH rise represents an increase in $OH^o$ concentration of $10^{(9.2-8.5)} = 10^{(0.7)} = 5.01$ times. This is a significant rise considering that an equal amount of $H^o$ radicals are generated and that such radicals tend to annihilate $OH^o$ radical, both reconstituting to water.

The internal block EMF of the tested cell and therefore its applied potential was 14.5 V in the earlier hours of the test, which is in keeping with the sum of 0.4 V back EMF of water plus 12.6 V ionization potential plus 1.5 V excitation loss to the energy gap of the $SiO_2.xH_2O$ semi-conductive insulation. In the third hour of the test the cell became slightly more conductive (as is evident from Table 1) resulting in a reduction of the total back EMF, and therefore also the input potential, by as much as 0.2 V. The reduction of cell back EMF is attributed to minor faults developing in the paraffin isolation coating resulting in variable amounts of electrolytic short circuiting taking place at the lead contact plate. This is confirmed by the variations in current draw by the cell. The lead, as expected developed a semi-conductive oxide coating ($PbO_2$) at such faults with an energy gap of approximately 1.3 V (as can be deduced from the remaining applied potential of 14.3 V). The cell continued to function for the remainder of the 16 hour test but the pH rise was definitely levelling off at pH=9.2 indicating that free radical formation had been reduced to just the area of the fault where the lead formed a secondary semi-conductive oxide coating. Reduction of BOD and COD continued for the duration of the test with no apparent lowering of the pH.

The operation demonstrates that the apparatus and process of the invention are applicable and beneficial in the treatment of raw sewage to lower both the BOD and COD in the sewage.

EXAMPLE VII

Employing the same apparatus and method cited in Examples IV—VI, three litres of homogenized milk were tested with the balance of the vessel being filled with distilled water. Under conditions similar to those in Example VI, including similar input voltage and current, treatment of milk resulted in a first hour BOD reduction of 190 mg/l and a COD reduction of 1600 mg/l from initial concentration levels of 24,030 mg/l and 32,800 mg/l respectively. The test confirms that the oxidation/reduction reactions involving stearates and fats in the treatment of dairy wastes progress very slowly, while the more direct oxidation of mineral compounds of calcium (and other minerals) progress much more rapidly.

All tests were conducted in cells similar to the cell described in FIG. 1, with the exception that the semi-conductive materials employed ($SiO_2$ and $SiO_2.xH_2O$) had an energy gap of 1.5 eV. The higher energy gap is reflected in the higher back EMF of the tested cells and therefore also the test input potentials. The anodic condenser structures tested thus far were effective in the generation of free radicals at the predicted input potentials and at extremely low current intensities (approximately 0.0025 amperes per square inch for the structure presented in FIG. 3 and cited in Example 4, 5, 6, and 7). The siliceous insulation provided 20% of its surface area to free radical generation and 80% to normal electrolysis because the total mass of $SiO_2$ offers only 20% p-type arc bias and 80% n-type contact bias. As the semi-conductor mass approaches 100% p-type bias, the free radical generation would be more abundant, rendering the normal electrolysis effects proportionally insignificant.

While this invnetion has been described as having a preferred design, it is understood that it is capable of further modifications, uses and/or adaptations following in general the principles of the invention including such departures from the present disclosure as come within known or customary practice in the art to which the invention pertains and as may be applied to the central features hereinbefore set forth, and fall within the scope of the invention of the limits of the appended claims.

What I claim is:
1. A method for electronically decomposing water into aqueous free radicals, comprising the steps of:
   a. providing a cell having therein an aqueous fluid, an anodic charge means in said aqueous fluid and a cathodic connector means in said aqueous fluid, said anodic charge means having semi-conductive material in contact with said aqueous fluid and means for restrictive electrical continuity with said aqueous fluid;

b. applying an electromotive force to the anodic charge means and to the cathodic connector means to form electrically an aqueous condenser at said anodic charge means; and, c. subjecting the formed condenser to an electromotive force equal to or greater than 12.6 volts whereby water is decomposed into aqueous free radicals.

2. The method of claim 1 wherein the aqueous fluid comprises a solution or suspension of substances in water for reaction with the aqueous free radicals formed.

3. The method of claim 2 wherein the aqueous fluid comprises waste water.

4. The method of claim 1 wherein said cathodic connector means forms a wet electrical connection with the aqueous fluid and including the step of connecting the cathodic connector means to the negative terminal of a direct current electrical power supply.

5. The method of claim 1 wherein said electrical continuity means comprises a wet electrical connection between said anodic charge means and the aqueous fluid, and including the step of connecting said anodic charge means to the positive terminal of a direct current electrical power supply.

6. An apparatus for electronically decomposing water into aqueous free radicals, comprising:

a. a cell adapted to have an aqueous fluid therein;

b. an anodic charge means in said cell positioned to be in said aqueous fluid, said anodic charge means having semi-conductive material for contact with said aqueous fluid and having means for restrictive electrical continuity with said aqueous fluid;

c. a conductive cathodic connector means in said cell positioned to be in said aqueous fluid; and, d. means for applying an electromotive force between said anodic charge means and said cathodic connector means for forming electrically an aqueous condenser at said anodic charge means, said electromotive force means being adapted to apply an electromotive force equal to or greater than 12.6 volts to said formed condenser whereby water is decomposed into aqueous free radicals.

7. The apparatus of claim 6 and including means for directing a moving stream of aqueous fluid through said cell.

8. The apparatus of claim 6 wherein said aqueous fluid comprises a solution or suspension of substances in water for reaction with the aqueous free radicals formed.

9. The apparatus of claim 6 wherein said cathodic connector means is positioned to be in said aqueous fluid for forming a wet connection with said aqueous fluid and said cathodic connector means is connected to the negative terminal of said electromotive force means.

10. The apparatus of claim 6 wherein said electrical continuity means comprises means for a wet electrical connection between said anodic charge means and said aqueous fluid and said anodic charge means is connected to the positive terminal of said electromotive force means.

11. The apparatus of claim 6 wherein said electrical continuity means comprises an uninsulated conducting core adapted to be in direct contact with said aqueous fluid, and said semi-conductive material comprises a covering comprising semi-conductive material on said core.

12. The apparatus of claim 11 wherein said core comprises an electrochemically passive material having a high electrical resistance.

13. The apparatus of claim 12 wherein said electrochemically passive material having a high electrical resistance comprises carbon.

14. The apparatus of claim 11 wherein said covering comprises a loose bed of semi-conductive granules.

15. The apparatus of claim 11 wherein said covering comprises a porous matrix of bound semi-conductive granules.

16. The apparatus of claim 6 wherein said anodic charge means includes an electrically conductive core and said semi-conductive material comprises an insulating coating comprising semi-conductive material on said core, said coating isolating said core from direct contact with said aqueous fluid, and said electrical continuity means comprises a means for providing an electrical bias in said semi-conductive coating between said core and said aqueous fluid.

17. The apparatus of claim 16 wherein said core comprises metal.

18. The apparatus of claim 16 wherein said coating comprises a matrix of bound semi-conductive material.

19. The apparatus of claim 16 wherein said coating comprises a developed semi-conductive chemically bound surface oxide.

20. The apparatus of claim 16 wherein said coating has thereon a covering comprising a loose bed of semi-conductive granules.

21. The apparatus of claim 16 wherein said coating has thereon a covering comprising a porous matrix of bound semi-conductive granules.

22. The apparatus of claim 11 wherein said semi-conductive material comprises a p-type semi-conductive material having an electrical energy gap greater than 1.23 eV and less than 12.6 eV.

23. The apparatus of claim 16 wherein said insulating semi-conductive coating comprises p-type semi-conductive material having an electrical energy gap greater than 1.23 eV and less than 12.6 eV, and said electrical biasing means comprises n-type semi-conductive material.

24. The apparatus of claim 20 wherein said semi-conductive granules comprise p-type semi-conductive material having an electrical energy gap greater than 1.23 eV and less than 12.6 eV.

25. The apparatus of claim 21 wherein said semi-conductive granules comprise p-type semi-conductive material having an electrical energy gap greater than 1.23 eV and less than 12.6 eV.

26. The apparatus of claim 16 wherein said insulating semi-conductive coating comprises p-type semi-conductive material having an electrical energy gap greater than 1.23 eV and less than 12.6 eV and said electrical biasing means comprises p-type semi-conductive material having an electrical energy gap less than 1.23 eV.

27. The apparatus of claim 16 wherein said insulating semi-conductive coating comprises p-type semi-conductive material having an electrical energy gap greater than 1.23 eV and less than 12.6 eV and said electrical biasing means comprises conducting material having a high electrical resistance.

28. The apparatus of claim 16 wherein said insulating semi-conductive coating comprises p-type semi-conductive material having an electrical energy gap greater than 1.23 eV and less than 12.6 eV and said electrical biasing means comprises pores in said coating for permitting restricted conductivity.

29. The apparatus of claim 22 wherein said semi-conductive material comprises silicon dioxide.

30. The apparatus of claim 23 wherein said semi-conductive material comprises silicon dioxide.

31. The apparatus of claim 24 wherein said semi-conductive material comprises silicon dioxide.

32. The apparatus of claim 6 wherein said cathodic connector means comprises metal.

33. The apparatus of claim 6 wherein said cathodic connector means comprises a conductive non-metal.

34. The apparatus of claim 6 wherein said cathodic connector means comprises a conductive core having a protective semi-conductive coating thereon adapted to provide a total electrical conductivity greater than that required by said anodic charge means.

35. The method of claim 1 wherein the aqueous fluid comprises pure water for forming an aqueous solution charged with free radicals.

36. The apparatus of claim 6 wherein said aqueous fluid comprises pure water for forming an aqueous solution charged with free radicals.

* * * * *